United States Patent
Papasakellariou et al.

(10) Patent No.: US 11,902,911 B2
(45) Date of Patent: *Feb. 13, 2024

(54) UPLINK POWER CONTROL IN DUAL CONNECTIVITY

(71) Applicant: Samsung Electronics Co., Ltd., Suwon-si (KR)

(72) Inventors: Aris Papasakellariou, Houston, TX (US); Jung Hyun Bae, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/052,894

(22) Filed: Nov. 4, 2022

(65) Prior Publication Data

US 2023/0102997 A1 Mar. 30, 2023

Related U.S. Application Data

(63) Continuation of application No. 17/248,447, filed on Jan. 25, 2021, now Pat. No. 11,546,864.

(Continued)

(51) Int. Cl.
*H04W 52/34* (2009.01)
*H04L 41/0803* (2022.01)
(Continued)

(52) U.S. Cl.
CPC ....... *H04W 52/346* (2013.01); *H04L 41/0803* (2013.01); *H04W 24/10* (2013.01);
(Continued)

(58) Field of Classification Search
CPC ... H04W 52/04; H04W 52/34; H04W 52/346; H04W 72/12; H04W 72/1278;
(Continued)

(56) References Cited

U.S. PATENT DOCUMENTS 8,489,100 B2 * 7/2013 Vajapeyam ........... H04W 52/40
455/522
2011/0237288 A1 9/2011 Ratasuk
(Continued)

FOREIGN PATENT DOCUMENTS

WO 2016091276 A1 6/2016
WO 2021204405 A1 10/2021

OTHER PUBLICATIONS

International Search Report of the International Searching Authority dated May 28, 2021, in connection with International Application No. PCT/KR2021/001843, 3 pages.

(Continued)

*Primary Examiner* — Warner Wong

(57) ABSTRACT

Methods and apparatuses for managing dual connectivity. A method for operating a UE includes receiving a configuration for dynamic power sharing (DPS) between transmissions on a master cell group (MCG) and transmissions on a secondary cell group (SCG) and determining a time offset as a function of sub-carrier spacing (SCS) configurations and of configurations for a PUSCH processing capability on the MCG and on the SCG. The method further includes determining a maximum power for a PUSCH transmission on the SCG, at a beginning of the PUSCH transmission on the SCG, when each of the transmissions on the MCG is scheduled by a downlink control information (DCI) format in a PDCCH reception that ends at least the time offset before the beginning of the PUSCH transmission on the SCG. The method further includes transmitting the transmissions on the MCG and the PUSCH transmission on the SCG.

15 Claims, 7 Drawing Sheets

Related U.S. Application Data

(60) Provisional application No. 63/064,064, filed on Aug. 11, 2020, provisional application No. 63/050,364, filed on Jul. 10, 2020, provisional application No. 62/976,649, filed on Feb. 14, 2020.

(51) Int. Cl.
| | |
|---|---|
| *H04W 72/044* | (2023.01) |
| *H04W 24/10* | (2009.01) |
| *H04W 74/08* | (2009.01) |
| *H04W 52/36* | (2009.01) |
| *H04W 72/20* | (2023.01) |
| *H04W 88/06* | (2009.01) |

(52) U.S. Cl.
CPC ......... *H04W 52/36* (2013.01); *H04W 72/044* (2013.01); *H04W 72/20* (2023.01); *H04W 74/0833* (2013.01); *H04W 88/06* (2013.01)

(58) Field of Classification Search
CPC ......... H04W 72/1289; H04W 72/1294; H04W 52/30; H04W 52/36; H04W 24/00; H04W 24/10; H04W 88/00; H04W 88/02; H04W 88/06; H04W 72/04; H04W 72/044; H04W 72/0453; H04L 41/08; H04L 41/0803
See application file for complete search history.

(56) References Cited

U.S. PATENT DOCUMENTS

| | | | |
|---|---|---|---|
| 2013/0176953 A1* | 7/2013 | Stern-Berkowitz | H04W 52/365 370/329 |
| 2013/0272230 A1 | 10/2013 | Dinan | |
| 2014/0071902 A1 | 3/2014 | Sorrentino | |
| 2014/0177602 A1* | 6/2014 | Chen | H04W 56/00 370/336 |
| 2015/0271758 A1* | 9/2015 | Park | H04L 5/0053 370/280 |
| 2015/0271761 A1 | 9/2015 | Park | |
| 2015/0282103 A1 | 10/2015 | Immonen | |
| 2015/0304957 A1 | 10/2015 | Noh | |
| 2015/0341865 A1 | 11/2015 | Yang | |
| 2015/0351039 A1* | 12/2015 | Yang | H04W 4/08 370/328 |
| 2016/0021618 A1 | 1/2016 | Yin | |
| 2016/0374027 A1 | 12/2016 | Dinan | |
| 2017/0013565 A1* | 1/2017 | Pelletier | H04W 72/0473 |
| 2017/0215107 A1 | 7/2017 | Kakishima | |
| 2017/0222856 A1* | 8/2017 | Dinan | H04W 72/21 |
| 2017/0238262 A1 | 8/2017 | Park | |
| 2019/0191328 A1 | 6/2019 | Dinan | |
| 2019/0239168 A1 | 8/2019 | Li | |
| 2020/0037260 A1 | 1/2020 | Fu | |
| 2020/0068504 A1 | 2/2020 | Yi | |
| 2020/0084728 A1 | 3/2020 | Park | |
| 2020/0137695 A1* | 4/2020 | Papasakellariou | H04W 52/08 |
| 2020/0329437 A1 | 10/2020 | MolavianJazi | |
| 2021/0337427 A1 | 10/2021 | Takeda | |
| 2022/0191802 A1 | 6/2022 | Koorapaty | |
| 2023/0078181 A1* | 3/2023 | Ghanbarinejad | H04W 52/383 |

OTHER PUBLICATIONS

Apple Inc., "Uplink power control for NR-NR Dual Connectivity," R1-1912832, 3GPP TSG RAN WG1 Meeting #99, Reno, USA, Nov. 18-22, 2019, 4 pages.

Motorola Mobility, "Further Discussion for SCG MPR/A-MPR and PCMAX for EN-DC with Dynamic Power Sharing," 3GPP TSG RAN WG4 #91, Reno, USA, May 13-17, 2019, 25 pages.

Samsung, "Uplink Power Control for NN-DC," R1-1912495, 3GPP TSG RAN WG1 Meeting #99, Reno, USA, Nov. 18-22, 2019, 3 pages.

ZTE Corporation, "Discussion on uplink power control for NR-DC," R1-1911970, 3GPP TSG RAN WG1 Meeting #99, Reno, USA, Nov. 18-22, 2019, 3 pages.

"5G; NR; Physical channelsand modulation (3GPP TS 38.211 version 16.2.0 Release 16)", ETSI TS 138 211 V16.2.0, Jul. 2020, 136 pages.

"5G; NR; Multiplexing and channel coding (3GPP TS 38.212 version 16.2.0 Release 16)", ETSI TS 138 212 V16.2.0, Jul. 2020, 154 pages.

"5G; NR; Physical layer procedures for control (3GPP TS 38.213 version 16.2.0 Release 16)", ETSI TS 138 213 V16.2.0, Jul. 2020, 180 pages.

"5G; NR; Physical layer procedures for data (3GPP TS 38.214 version 16.2.0 Release 16)", ETSI TS 138 214 V16.2.0, Jul. 2020, 167 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

"5G; NR; Medium Access Control (MAC) protocol specification (3GPP TS 38.321 version 16.1.0 Release 16)", ETSI TS 138 321 V16.1.0, Jul. 2020, 153 pages.

* cited by examiner

UPLINK POWER CONTROL IN DUAL CONNECTIVITY

CROSS-REFERENCE TO RELATED APPLICATIONS AND CLAIM OF PRIORITY

This application is a continuation of U.S. patent application Ser. No. 17/248,447 filed Jan. 25, 2021, which claims priority to U.S. Provisional Patent Application No. 62/976,649 filed Feb. 14, 2020, U.S. Provisional Patent Application No. 63/050,364, filed on Jul. 10, 2020, and U.S. Provisional Patent Application No. 63/064,064, filed on Aug. 11, 2020. The content of the above-identified patent documents is incorporated herein by reference in its entirety.

TECHNICAL FIELD

The present disclosure relates to wireless communication systems. More particularly, the present disclosure relates to timelines required for a user equipment (UE) to determine a transmission power for operation with dual connectivity.

BACKGROUND

There is a demand for an improved 5G communication system. The 5G communication system can be implemented in higher frequency (mmWave) bands, for example 30 GHz bands, to enable higher data rates and/or in lower frequency bands, such as below 6 GHz, to support large coverage and enhanced mobility. A user equipment (UE) can communicate with multiple network nodes and operate with carrier aggregation when a backhaul latency among the multiple network nodes is negligible or with dual connectivity otherwise. When a UE operates in dual connectivity with a master node and a secondary node, one of the main design objectives is partitioning of UE capabilities between the two nodes because scheduling from the two nodes of transmissions from the UE or receptions by the UE can be uncoordinated. One such capability is a maximum UE transmission power where a conservative partitioning can lead to loss of coverage and of spectral efficiency while an aggressive partitioning can lead to dropped transmissions, degrade quality of service on the secondary node and may also reduce spectral efficiency.

SUMMARY

The present disclosure relates to monitoring downlink control channels for communication with multiple TRPs.

In one embodiment, a method for a user equipment (UE) is provided. The method includes receiving a configuration for dynamic power sharing (DPS) between transmissions on a master cell group (MCG) and transmissions on a secondary cell group (SCG) and determining a time offset $T_{offset}$ as a function of sub-carrier spacing (SCS) configurations and of configurations for a physical uplink shared channel (PUSCH) processing capability on the MCG and on the SCG. The method further includes determining a maximum power for a PUSCH transmission on the SCG, at a beginning of the PUSCH transmission on the SCG, when each of the transmissions on the MCG is scheduled by a downlink control information (DCI) format in a physical downlink control channel (PDCCH) reception that ends at least the $T_{offset}$ before the beginning of the PUSCH transmission on the SCG. The method further includes transmitting the transmissions on the MCG and the PUSCH transmission on the SCG where a power for the PUSCH transmission on the SCG is not larger than the maximum power.

In another embodiment, a UE is provided. The UE includes a processor configured to determine: (i) a time offset $T_{offset}$ as a function of SCS configurations and of configurations for a PUSCH processing capability on a MCG and on a SCG and (ii) a maximum power for a PUSCH transmission on the SCG, at a beginning of the PUSCH transmission on the SCG, when each of transmissions on the MCG is scheduled by a DCI format in a PDCCH reception that ends at least the $T_{offset}$ before the beginning of the PUSCH transmission on the SCG. The UE further includes a transceiver, operably coupled to the processor. The transceiver is configured to receive a configuration for DPS between the transmissions on the MCG and transmissions on the SCG and transmit the transmissions on the MCG and the PUSCH transmission on the SCG. A power for the PUSCH transmission on the SCG is not larger than the maximum power.

In yet another embodiment, a network node is provided. The network node includes a processor configured to determine a time offset as a maximum of a first time offset and a second time offset. The first time offset is applicable on the network node. The second time offset is applicable on a second network node. The network node further includes a transceiver, operably connected to the processor. The transceiver is configured to transmit a configuration for DPS between transmissions to the network node and transmissions to the second network node and transmit a first PDCCH that provides a first DCI format. The first DCI format schedules a transmission of a first PUSCH, and a beginning of transmission of first PUSCH transmission is after an end of the first PDCCH transmission by at least the time offset. The transceiver is further configured to receive the first PUSCH.

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
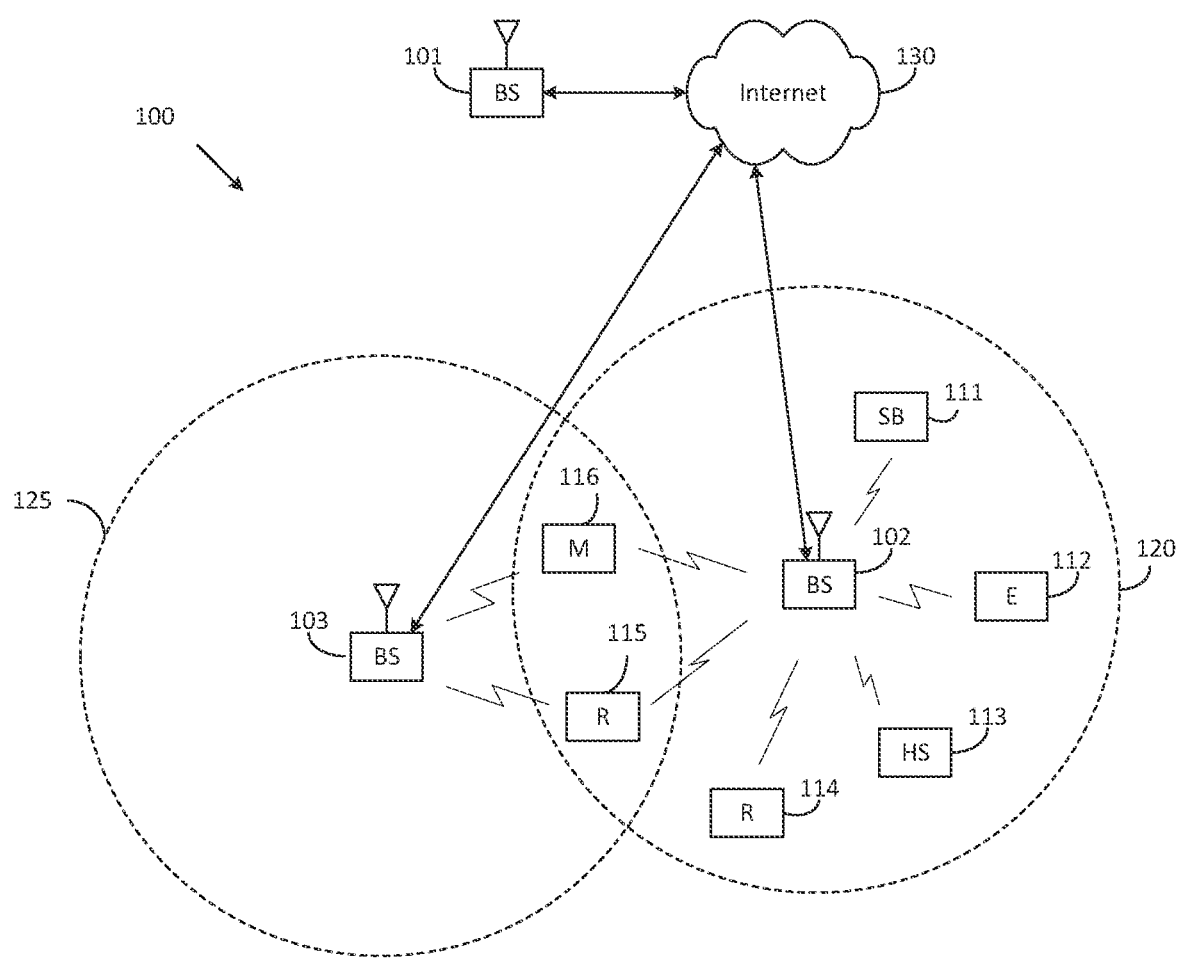
FIG. 1 illustrates an example wireless network according to embodiments of the present disclosure.

FIGS. 1 through 9, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

Depending on the network type, the term 'network node' or 'base station' can refer to any component, or collection of components, configured to provide wireless access to a network, such as a transmit point (TP), a TRP, a gNB, a macrocell, a femtocell, a WiFi access point (AP), or other wirelessly enabled devices. Base stations can provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. The terms 'gNB' and 'network node' can be used interchangeably in this disclosure to refer to network infrastructure components that provide wireless access to remote terminals. Also, depending on the network type, the term UE can refer to any component such as mobile station, subscriber station, remote terminal, wireless terminal, receive point, or user device. A UE can be a mobile device or a stationary device.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

A 5G communication system can be implemented in higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are considered in 5G communication systems. In addition, in 5G communication systems, development for system network improvement is under way based on advanced small cells, cloud Radio Access Networks (RANs), ultra-dense networks, device-to-device (D2D) communication on sidelink, wireless backhaul, moving network, cooperative communication, Coordinated Multi-Point (CoMP) transmissions/receptions such as from multiple TRPs, reception-end interference cancellation and the like.

The discussion of 5G systems and frequency bands associated therewith is for reference as certain embodiments of the present disclosure can be implemented in 5G systems. However, the present disclosure is not limited to 5G systems or the frequency bands associated therewith, and embodiments of the present disclosure can be utilized in connection with any frequency band.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network.

The gNB 102 provides wireless broadband access to the network 130 for a first plurality of UEs within a coverage area 120 of the gNB 102. The first plurality of UEs includes a UE 111, which can be located in a small business; a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

Although FIG. 1 illustrates one example of a wireless network 100, various changes can be made to FIG. 1. For example, the wireless network 100 can include any number of gNBs and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as other types of data networks.

Figure 2:
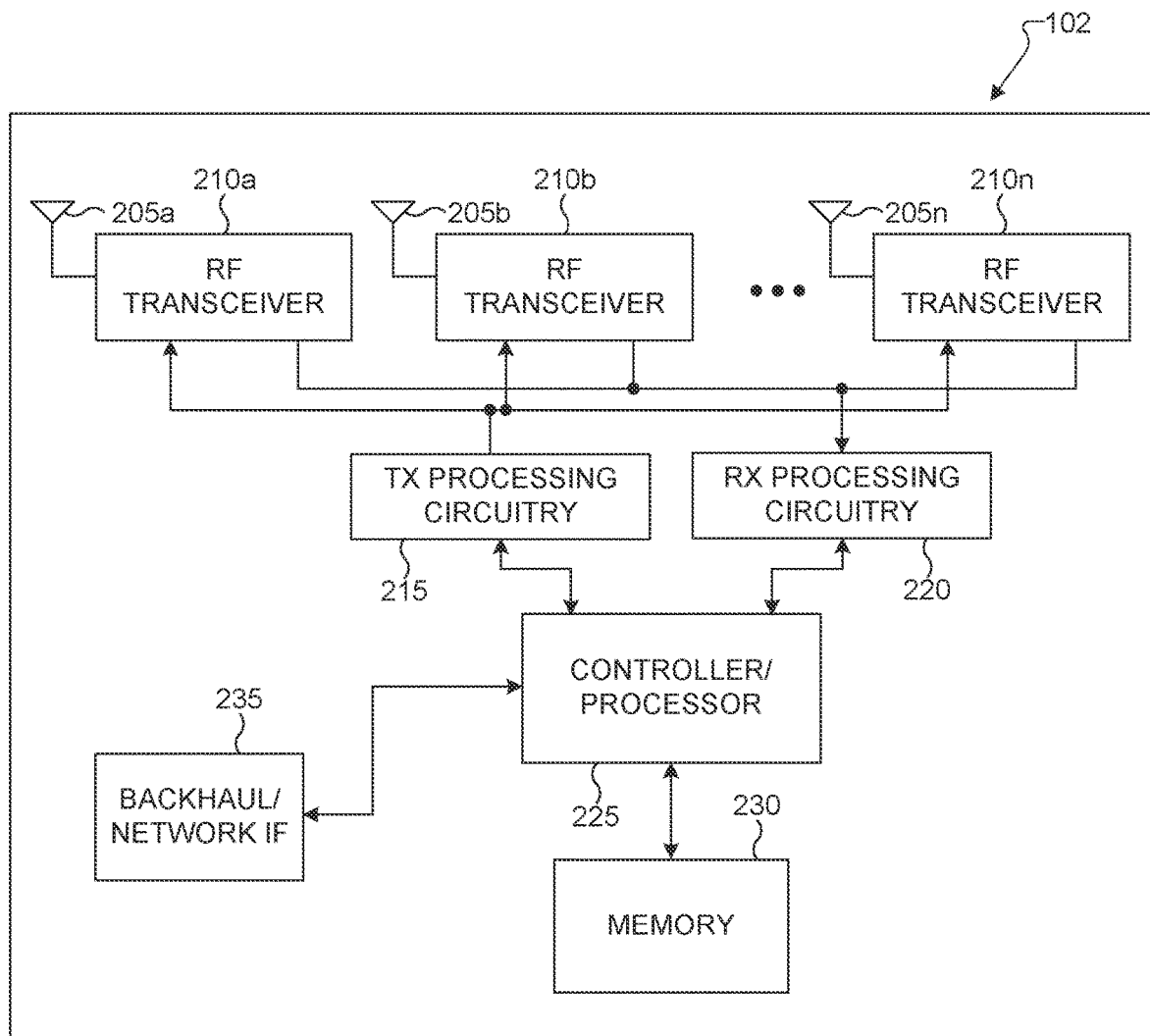
FIG. 2 illustrates an example gNB according to embodiments of the present disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 transmit downlink control channels for communication with multiple TRPs. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
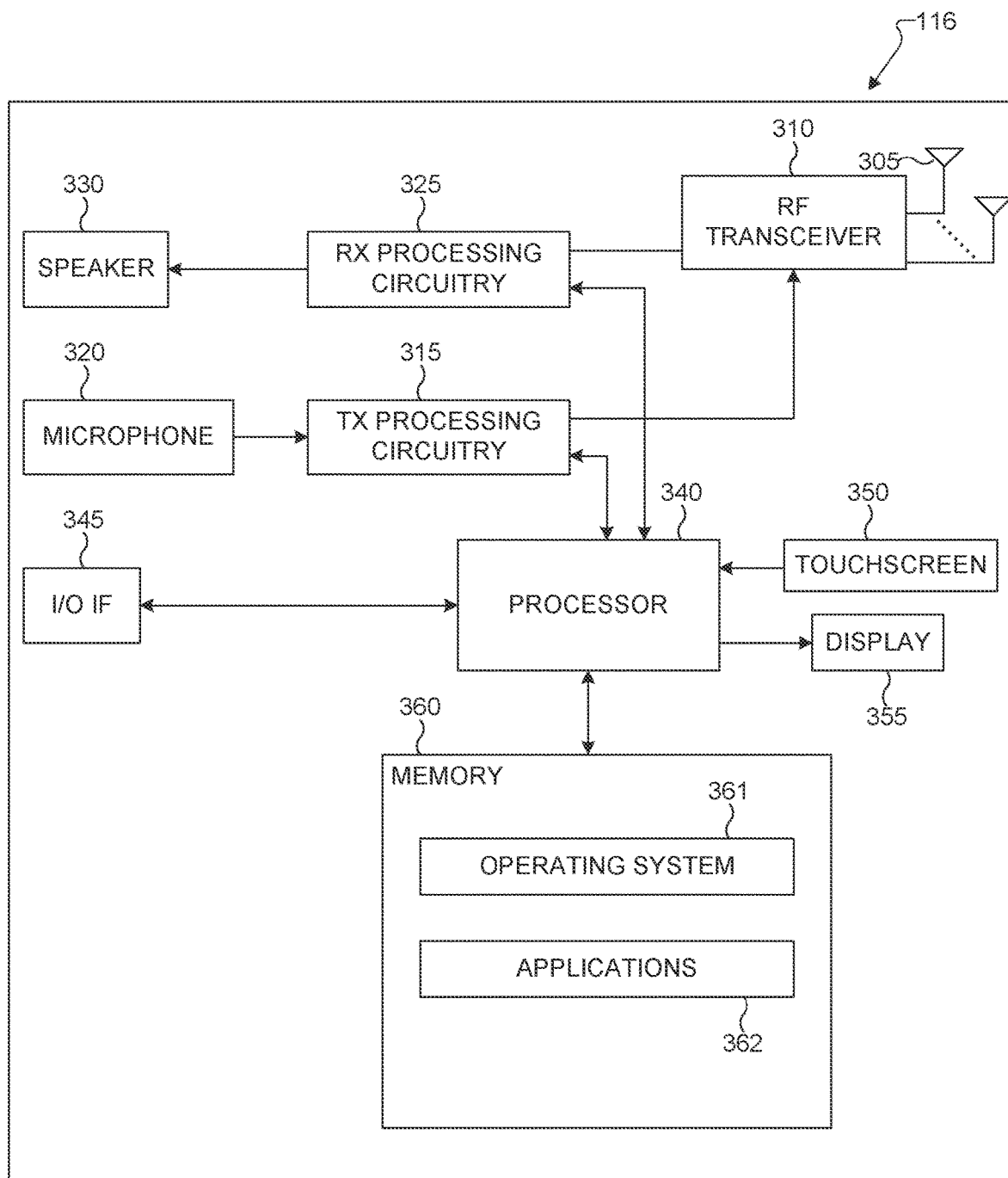
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for transmitting to or receiving from a master node and a secondary node. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
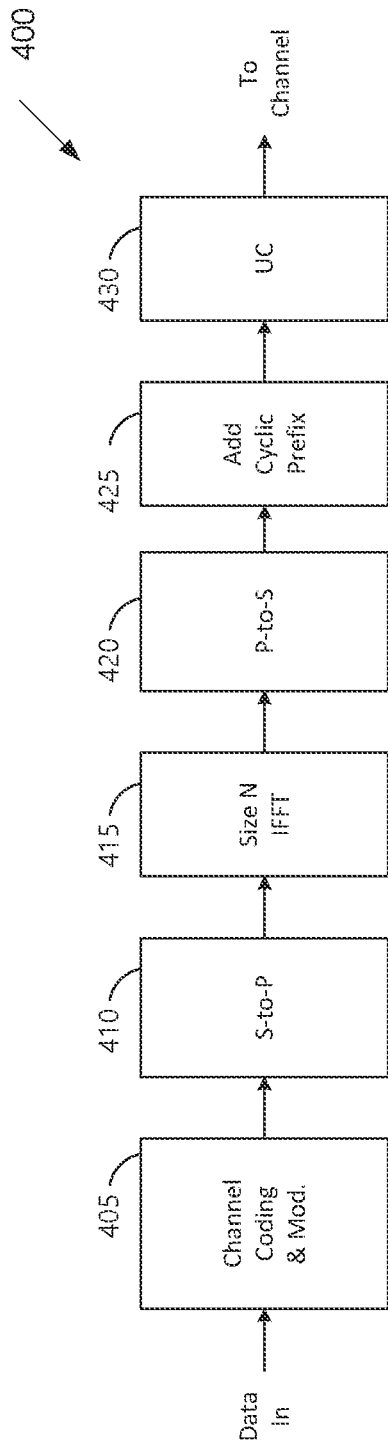
FIG. 4A illustrates a high-level diagram of an orthogonal frequency division multiple access transmit path according to embodiments of the present disclosure.
Figure 4B:
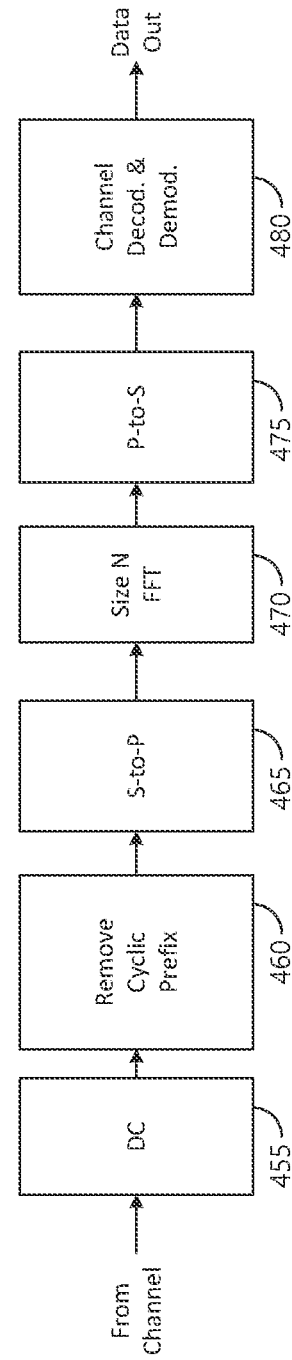
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (gNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. gNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It may be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A time unit for DL signaling or for UL signaling on a cell is one symbol. A symbol belongs to a slot that includes a number of symbols, such as 14 symbols, and is referred to as DL symbol if used for DL signaling, UL symbol if used for UL signaling, or flexible symbol if it can be used for either DL signaling or UL signaling. The slot can also be a time unit for DL or UL signaling on a cell.

A bandwidth (BW) unit is referred to as a resource block (RB). One RB includes a number of sub-carriers (SCs), such as 12 subcarriers. An RB in one symbol of a slot is referred to as physical RB (PRB) and includes a number of resource elements (REs). For example, a slot can have a duration of 1 millisecond and an RB can have a BW of 180 kHz and include 12 SCs with SC spacing of 15 kHz. As another example, a slot can have a duration of 0.25 milliseconds and an RB can have a BW of 720 kHz and include 12 SCs with SC spacing of 60 kHz.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH transmission can be over a variable number of slot symbols including one slot symbol. A gNB transmits one or more of multiple types of RS including channel state information RS (CSI-RS) and demodulation RS (DM-RS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as radio resource control (RRC) signaling from a gNB. Transmission instances of a CSI-RS can be indicated by DL control signaling or configured by higher layer signaling. A DM-RS is typically transmitted only in the BW of a respective PDCCH or PDSCH and a UE can use the DM-RS to demodulate data or control information.

UL signals also include data signals conveying information content, control signals conveying UL control information (UCI), DM-RS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. When a UE simultaneously transmits data information and UCI, the UE can multiplex both in a PUSCH.

UCI includes hybrid automatic repeat request acknowledgement (HARQ-ACK) information, indicating correct or incorrect detection of data transport blocks (TB s) in a PDSCH, scheduling request (SR) indicating whether a UE has data in its buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs. A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel (PRACH).

Figure 5:
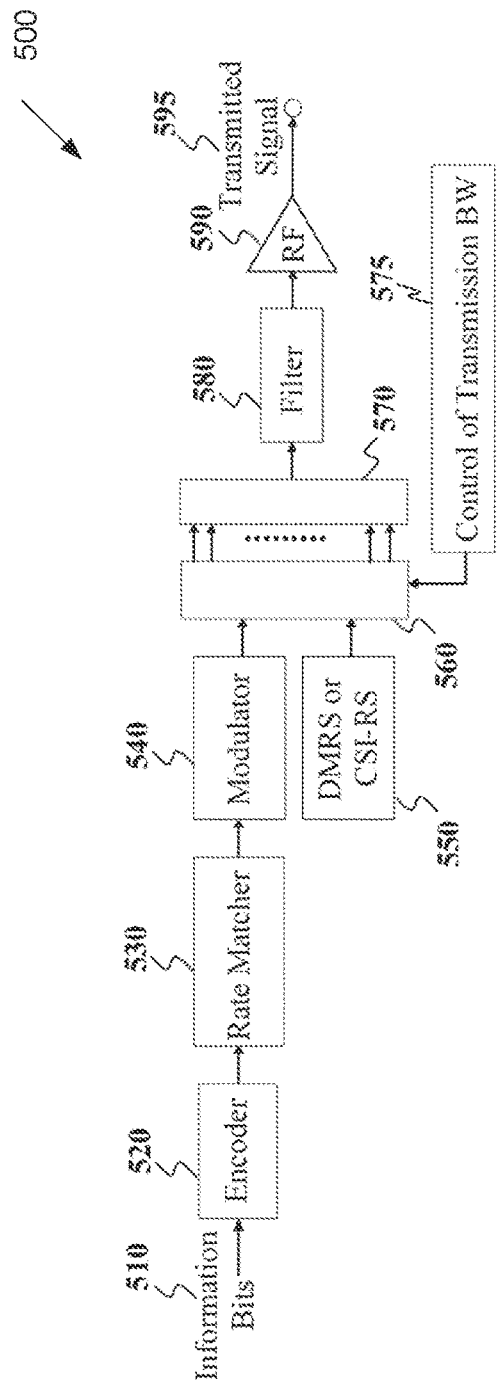
FIG. 5 illustrates an example transmitter structure using OFDM according to embodiments of the present disclosure.

FIG. 5 illustrates an example transmitter structure 500 using OFDM according to embodiments of the present disclosure. An embodiment of the transmitter structure 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 510, are encoded by encoder 520, rate matched to assigned time/frequency resources by rate matcher 530, and modulated by modulator 540. Subsequently, modulated encoded symbols and DMRS or CSI-RS 550 are mapped to SCs 560 by SC mapping unit 575, an inverse fast Fourier transform (IFFT) is performed by filter 570, a cyclic prefix (CP) is added by CP insertion unit 580, and a resulting signal is filtered by filter 590 and transmitted by a radio frequency (RF) unit 595.

Figure 6:
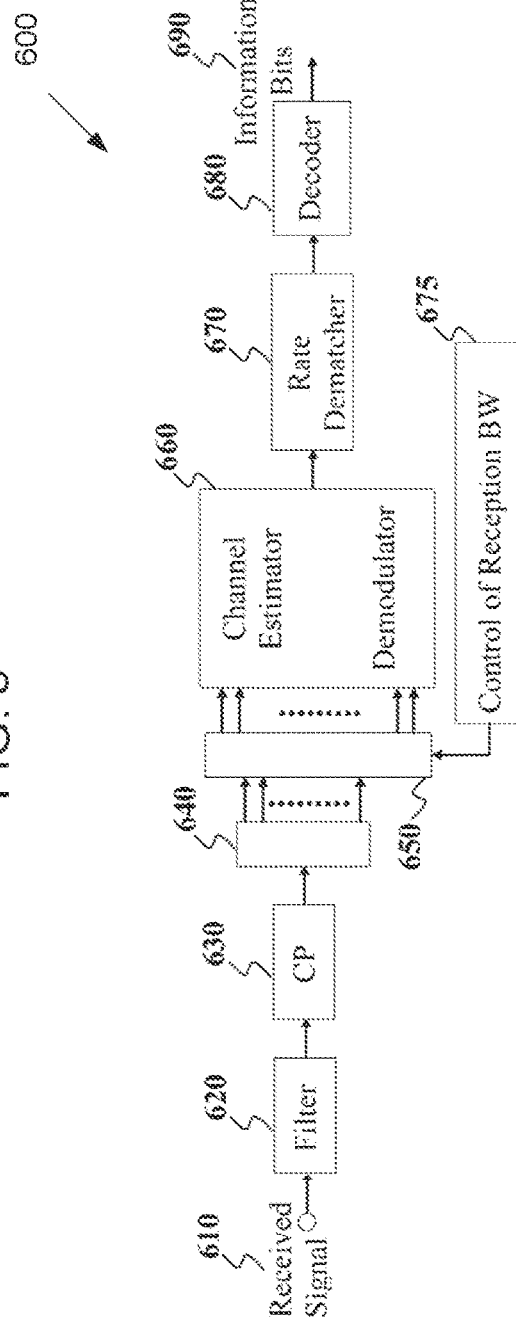
FIG. 6 illustrates an example receiver structure using OFDM according to embodiments of the present disclosure.

FIG. 6 illustrates an example receiver structure 600 using OFDM according to embodiments of the present disclosure. An embodiment of the receiver structure 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A received signal 610 is filtered by filter 620, a CP removal unit removes a CP 630, a filter 640 applies a fast Fourier transform (FFT), SCs de-mapping unit 650 de-maps SCs selected by BW selector unit 675, received symbols are demodulated by a channel estimator and a demodulator unit 660, a rate de-matcher 670 restores a rate matching, and a decoder 680 decodes the resulting bits to provide information bits 690.

A UE can be configured to operate with carrier aggregation (CA) or dual connectivity (DC). For operation with CA or with DC, the UE can be configured with a first group of cells comprising a master cell group (MCG) and with a second group of cells comprising a secondary cell group (SCG). For operation with DC, the UE can be configured a first and second maximum powers for transmissions to the MCG and the SCG, respectively. A maximum UE transmission power for operation with a MCG and a SCG can be semi-statically partitioned, by higher layer signaling, between the master node (MN) of the MCG and the secondary node (SN) of the SCG, or dynamic power sharing can be possible under certain conditions where transmissions on the SCG can use leftover power from transmissions on the MCG, and the reverse, subject to a total transmission power not exceeding the maximum UE transmission power for operation with the MCG and the SCG. The terms MCG and MN and the terms SCG and SN are used interchangeably in this disclosure. A power control mechanism can depend on whether transmissions on different cells have a same duration and on whether transmissions on different cells are synchronized with respect to a slot boundary. Moreover, for LTE and NR coexistence at a UE, where LTE provides the MCG and NR provides the SCG.

A fixed partitioning of a maximum UE transmission power between the MCG and the SCG is suboptimal as it reduces a maximum UE transmission power per CG below the maximum UE transmission power. Such partitioning results to reduced coverage since, for example, the UE has less available power to transmit on the MCG, and to reduced spectral efficiency. A dynamic power sharing (DPS) mechanism enabling the UE to use available power for transmissions on either the MCG or the SCG depending on actual transmissions at a given time circumvents the shortcomings of a fixed partitioning of the maximum UE transmission power between the MCG and the SCG but introduces new challenges to the UE for determining the available power at a given time since this requires the UE to know the actual transmissions and their contents at that time. Power allocation to transmissions on the MCG can be prioritized and then the problem reduces to determining an available power that the UE can use for transmissions on the SCG at a given time, after allocating power for transmissions on the MCG.

In order to determine a transmission power at a given time, the transmitted channels/signals and their contents need to be determined. Also, if a UE would have time overlapping transmissions on a cell (or a bandwidth part of a cell) at a given time, the UE may need to resolve such overlapping by multiplexing the information contents in one channel and transmitting only that one channel. For example, if a UE would transmit on a cell a PUCCH and a PUSCH that would overlap in time, the UE can multiplex the UCI of the PUCCH in the PUSCH and transmit only the PUSCH. For example, if a UE would transmit on a cell a first PUCCH and a second PUCCH that would overlap in time, the UE can multiplex all UCI in a one PUCCH and transmit the one PUCCH. Such resolutions of time overlapped transmissions on a same cell require a certain processing time that is determined by a processing time of respective PDCCH receptions, in case the transmissions are scheduled by DCI formats, and a preparation time for a transmission after resolving an overlapping of the transmissions.

If a UE would transmit multiple overlapping PUCCHs in a slot or overlapping PUCCH(s) and PUSCH(s) in a slot and the UE is configured to multiplex different UCI types in one PUCCH, and at least one of the multiple overlapping PUCCHs or PUSCHs is in response to a DCI format detection by the UE, the UE multiplexes all corresponding UCI types if the following conditions are met. If one of the PUCCH transmissions or PUSCH transmissions is in response to a DCI format detection by the UE, the UE expects that the first symbol $S_0$ of the earliest PUCCH or PUSCH, among a group overlapping PUCCHs and PUSCHs in the slot, satisfies the following timeline conditions:

$S_0$ is not before a symbol with cyclic prefix (CP) starting after $T_{proc,1}^1$ after a last symbol of any corresponding PDSCH, $T_{proc,1}^{mux}$ given by maximum of $\{T_{proc,1}^{mux,1}, \ldots, T_{proc,1}^{mux,i} \ldots\}$ are for the i-th PDSCH with corresponding HARQ-ACK transmission on a PUCCH which is in the group of overlapping PUCCHs and PUSCHs, $T_{proc,1}^{mux,i}=(N_1+d_{1,1}+1) \cdot (2048+144)\cdot\kappa\cdot 2^{-\mu}\cdot T_C$, $d_{1,1}$ is selected for the i-th PDSCH following, $N_1$ is selected based on the UE PDSCH processing capability of the i-th PDSCH and SCS configuration $\mu$, where $\mu$ corresponds to the smallest subcarrier spacing (SCS) configuration among the SCS configurations used for the PDCCH scheduling the i-th PDSCH (if any), the i-th PDSCH, the PUCCH with corresponding HARQ-ACK transmission for i-th PDSCH, and all PUSCHs in the group of overlapping PUCCHs and PUSCHs.

$S_0$ is not before a symbol with CP starting after $T_{proc,release}^{mux}$ after a last symbol of any corresponding semi-persistently scheduled (SPS) PDSCH release. $T_{proc,release}^{mux}$ is given by maximum of $\{T_{proc,release}^{mux,1}, \ldots, T_{proc,release}^{mux,i}, \ldots\}$ where for the i-th PDCCH providing the SPS PDSCH release with corresponding HARQ-ACK transmission on a PUCCH which is in the group of overlapping PUCCHs and PUSCHs, $T_{proc,release}^{mux,i}=(N+1)\cdot(2048+144)\cdot\kappa\cdot 2^{-\mu}\cdot T_C$, N is selected based on the UE PDSCH processing capability of the i-th SPS PDSCH release and SCS configuration $\mu$, where $\mu$ corresponds to the smallest SCS configuration among the SCS configurations used for the PDCCH providing the i-th SPS PDSCH release, the PUCCH with corresponding HARQ-ACK transmission for i-th SPS PDSCH release, and all PUSCHs in the group of overlapping PUCCHs and PUSCHs.

if there is no aperiodic CSI report multiplexed in a PUSCH in the group of overlapping PUCCHs and PUSCHs, $S_0$ is not before a symbol with CP starting after $T_{proc,2}^{mux}$ after a last symbol of any PDCCH with the DCI format scheduling an overlapping PUSCH, and any PDCCH scheduling a PDSCH or SPS PDSCH release with corresponding HARQ-ACK information in an overlapping PUCCH in the slot If there is at least one PUSCH in the group of overlapping PUCCHs and PUSCHs, $T_{proc,2}^{mux}$ is given by maximum of $\{T_{proc,2}^{mux,1}, \ldots, T_{proc,2}^{mux,i} \ldots\}$ where for the i-th PUSCH which is in the group of overlapping PUCCHs and PUSCHs, $T_{proc,2}^{mux,i}=\max((N_2+d_{2,1}+1)\cdot(2048+144)\cdot\kappa\cdot 2^{-\mu}\cdot T_C, d_{2,2})$, $d_{2,1}$ and $d_{2,2}$ are selected for the i-th PUSCH, $N_2$ is selected based on the UE PUSCH processing capability of the i-th PUSCH and SCS configuration $\mu$, where $\mu$ corresponds to the smallest SCS configuration among the SCS configurations used for the PDCCH scheduling the i-th PUSCH (if any), the PDCCHs scheduling the PDSCHs with corresponding HARQ-ACK transmission on a PUCCH which is in the group of overlapping PUCCHs/PUSCHs, and all PUSCHs in the group of overlapping PUCCHs and PUSCHs. If there is no PUSCH in the group of overlapping PUCCHs and PUSCHs, $T_{proc,2}^{mux}$ is given by maximum of $\{T_{proc,2}^{mux,1}, \ldots, T_{proc,2}^{mux,i} \ldots\}$ where for the i-th PDSCH with corresponding HARQ-ACK transmission on a PUCCH which is in the group of overlapping PUCCHs, $T_{proc,2}^{mux,i}=(N_2+1)\cdot(2048+144)\cdot\kappa\cdot 2^{-\mu}\cdot T_C$, $N_2$ is selected based on the UE PUSCH processing capability of the PUCCH serving cell if configured. $N_2$ is selected based on the UE PUSCH processing capability 1, if PUSCH processing capability is not configured for the PUCCH serving cell. $\mu$ is selected based on the smallest SCS configuration between the SCS configuration used for the PDCCH scheduling the i-th PDSCH (if any) with corresponding HARQ-ACK transmission on a PUCCH which is in the group of overlapping PUCCHs, and the SCS configuration for the PUCCH serving cell.

if there is an aperiodic CSI report multiplexed in a PUSCH in the group of overlapping PUCCHs and PUSCHs, $S_0$ is not before a symbol with CP starting after $T_{proc,CSI}^{mux}=\max((Z+d)\cdot(2048+144)\cdot\kappa\cdot 2^{-\mu}\cdot T_C, d_{2,2})$ after a last symbol of any PDCCH with the DCI format scheduling an overlapping PUSCH, and any PDCCH scheduling a PDSCH or SPS PDSCH release with corresponding HARQ-ACK information in an overlapping PUCCH in the slot where $\mu$ corresponds to the smallest SCS configuration among the SCS configuration of the PDCCHs, the smallest SCS configuration for the group of the overlapping PUSCHs, and the smallest SCS configuration of CSI-RS associated with the DCI format scheduling the PUSCH with the multiplexed aperiodic CSI report, and d=2 for $\mu$=0,1, d=3 for $\mu$=2 and d=4 for $\mu$=3

$N_1$, $N_2$, $d_{1,1}$, $d_{2,1}$, $d_{2,2}$, and Z are defined in TS 38.214 v16.0.0, and $\kappa$ and $T_C$ are defined in TS 38.211 V16.0.0.

TABLE 1

PUSCH preparation time for PUSCH timing/processing capability 1

| $\mu$ | PUSCH preparation time $N_2$ [symbols] |
|---|---|
| 0 | 10 |
| 1 | 12 |

TABLE 1-continued

PUSCH preparation time for PUSCH timing/processing capability 1

| $\mu$ | PUSCH preparation time $N_2$ [symbols] |
|---|---|
| 2 | 23 |
| 3 | 36 |

TABLE 2

PUSCH preparation time for PUSCH timing/processing capability 2

| $\mu$ | PUSCH preparation time $N_2$ [symbols] |
|---|---|
| 0 | 5 |
| 1 | 5.5 |
| 2 | 11 for frequency range 1 |

If a UE is configured for DPS between MCG and SCG, for example, by setting a value of a higher layer parameter NR-DC-PC-mode to Dynamic, and indicates a capability to determine a total transmission power on the SCG at a first symbol of a transmission occasion on the SCG by determining transmissions on the MCG that are scheduled by DCI formats in PDCCH receptions with a last symbol that is earlier by more than $T_{offset}$ from the first symbol of the transmission occasion on the SCG, and overlap with the transmission occasion on the SCG the UE determines a maximum transmission power on the SCG at the beginning of the transmission occasion on the SCG as $\min(\hat{P}_{SCG}, \hat{P}_{Total}^{NR-DC}-\hat{P}_{MCG}^{actual})$, if the UE determines transmissions on the MCG with a $\hat{P}_{MCG}^{actual}$ total power (in the linear domain)

$\hat{P}_{Total}^{NR-DC}$, if the UE does not determine any transmissions on the MCG where $\hat{P}_{SCG}$ is a linear value of a maximum transmission power on the SCG and $\hat{P}_{Total}^{NR-DC}$ is a linear value of a of a configured maximum transmission power for NR-DC operation in a same frequency range.

A UE does not expect to have transmissions on the MCG that are scheduled by DCI formats in PDCCH receptions with a last symbol that is earlier by less than or equal to $T_{offset}$ from the first symbol of the transmission occasion on the SCG, and overlap with the transmission occasion on the SCG In order to maximize the gains from DPS when a UE indicates the aforementioned capability to determine a transmission power on the SCG, the value of $T_{offset}$ is of material importance as a value that is too small cannot satisfy UE processing requirements while a value that is too large diminishes the gains from DPS operation in dual connectivity. The UE processing requirements depend on a UE PUSCH processing capability and on a SCS configuration. As the UE prioritizes power allocation on the MCG and determines an available power on the SCG after power is allocated on the MCG, at a given time the UE needs to know the transmissions and their contents on the MCG in order to determine a corresponding total transmission power on the MCG and this needs to be prior to a time the UE needs to transmit on the SCG. Therefore, $T_{offset}$ needs to depend on the UE PUSCH processing capability for PUSCH preparation on both the MCG and the SCG and on corresponding SCS configurations.

In a first embodiment, once a UE knows the information content and the channels/signals to transmit at a given time, determination of transmission power can be on a symbol basis. Consequently, $T_{offset}$ can be based on a time the UE requires to determine the information contents and channels/signals at a given time in the future on the MCG/SCG. The larger the $T_{offset}$, the easier the UE implementation but the smaller the gains from DPS. Therefore, $T_{offset}$ should not be unnecessarily larger than a time a UE requires to determine a transmission power after preparing the contents of a transmission.

Similar to determining required UE processing times for resolving overlapping, there could be multiple $T_{offset}$ values depending on the channels a UE transmits on the MCG/SCG. A single $T_{offset}$ value can offer simplicity without materially penalizing performance gains from DPS in dual connectivity. For example, the largest processing time (across all cells of the MCG and the SCG), $T_{proc,CSI}^{mux}$, for resolving overlapping can be used. For example, depending on a DPS capability that a UE indicates to the network, the processing time for the UE can be assumed to be the maximum $T_{proc,2}^{mux}$, instead of the maximum $T_{proc,CSI}^{mux}$, across all cells of the MCG and the SCG, as in case there is PUCCH and PUSCH overlapping. Using $T_{proc,2}^{mux}$ instead of $T_{proc,CSI}^{mux}$ for $T_{offset}$ can result to a substantially smaller value of $T_{offset}$ and in return substantially increase the operational gains from DPS.

$T_{proc,2}^{mux}$ for a cell of the MCG and $T_{proc,2}^{mux}$ for a cell of the SCG depend on the UE PUSCH processing capability used on the cell of the MCG and the cell of the SCG, such as a UE PUSCH capability 1 or a UE PUSCH capability 2 as defined in TS 38.214 v16.0.0, and also depend on the SCS configuration on the cell of the MCG and the cell of the SCG. For example, for a UE operating with PUSCH processing capability 1 and μ=2 on a cell of the MCG and with PUSCH processing capability 1 and μ=0 on a cell of the SCG, $T_{proc,2}^{mux}$ can be determined using Tables 6.4-1 and 6.4-2 from TS 38.214 v16.0.0, $T_{proc,2}^{mux}$=24 symbols for μ=2, or equivalently $T_{proc,2}^{mux}$=6 symbols for μ=0 on the MCG, while $T_{proc,2}^{mux}$=10 symbols on the SCG (for simplicity, a same corresponding UE PUSCH processing capability and SCS is assumed for all cells on the MCG and all cells of the SCG; otherwise, the maximum $T_{proc,2}^{mux}$ among cells of the MCG and the maximum $T_{proc,2}^{mux}$ among all cells of the SCG is applicable). Therefore, about 4 additional symbols on the SCG would be needed in that case. For example, for a UE operating with PUSCH capability 2 and μ=2 on the MCG for determining and with PUSCH capability 1 and μ=0 on the SCG, $T_{proc,2}^{mux}$=12 symbols for μ=2, or equivalently 3 symbols for μ=0, on the MCG while $T_{proc,2}^{mux}$=10 symbols on the SCG. Therefore, about 7 additional symbols on the SCG would be needed in that case. For example, if the previous setups for the MCG and the SCG were reversed, 0 additional symbols to $T_{proc,2}^{mux}$ would be needed.

In general, $T_{offset}$ can be expressed as $T_{offset}=T_{proc,2}^{mux}+\delta$ where δ depends on the PUSCH processing capability and the SCS used on the MCG and the SCG.

In a first approach, a "worst case" scenario is considered where a single $T_{offset}$ value is defined corresponding to the largest possible value of $T_{offset}$ under allowed configurations for the UE processing time and the SCS on the MCG (across all cells of the MCG) and the SCG (across all cells of the SCG). That $T_{offset}$ is the one corresponding to the maximum across all cells of the MCG and the SCG as it is the largest value among $T_{proc,2}$, $T_{proc,2}^{mux}$, $T_{proc,release}^{mux}$, $T_{proc,CSI}$, and $T_{proc,CSI}^{mux}$. This is simple but inefficient and penalizes DPS operation for DC as $T_{proc,CSI}^{mux}$ (and $T_{proc,CSI}$) are typically much larger than $T_{proc,2}$, $T_{proc,2}^{mux}$, and $T_{proc,release}^{mux}$ and would therefore result to a value of $T_{offset}$ that is too large to be beneficial in practice for DPS as it requires significant delays on the MCG scheduling. For example, for UE processing PUSCH capability 1 and SCS of 15 kHz (μ=0), $T_{proc,CSI}^{mux}$ is 3 milliseconds while $T_{proc,2}^{mux}$ is 0.785 milliseconds.

In a second approach, $T_{offset}$ can be determined according to the MCG/SCG UE configurations in terms of corresponding UE PUSCH processing capability (PUSCH timing capability) and SCS configuration. Based on a DPS UE capability, $T_{proc,CSI}^{mux}$ and $T_{proc,CSI}$ can be excluded from the determination of $T_{offset}$ to avoid large values (the maximum corresponding value of $T_{proc,2}^{mux}$ across all cells of the MCG and all cells of the SCG is used instead). Additionally, as not all combinations are relevant, it is possible to select a subset of combinations for the UE to operate with for DPS in dual connectivity. For example, such combinations can be based on ones provided in Table 3.

TABLE 3

PUSCH timing/processing capability and SCS combinations for MCG and SCG

| Capability | μ | δ (symbols for μ = 0) |
|---|---|---|
| Same or lower on MCG | Same or lower on MCG | 0 |
| Higher on MCG | Same or lower on MCG | 5 |
| Same or lower on MCG | Higher on MCG | 3 |
| Higher on MCG | Higher on MCG | 7 |

Further, a power of configured (by higher layers) transmissions on the MCG can depend on a detection of a DCI format providing transmit power control (TPC) commands, such as a DCI format 2_2, in a PDCCH reception. For example, when a UE has overlapping transmissions on the MCG and the SCG, the UE may not apply a TPC command in a DCI format 2_2 to the transmission on the MCG when a time between the end of a PDCCH reception on the MCG that provides DCI format 2_2 and the beginning of the transmission on the SCG is less than $T_{offset}$. For example, application of a positive TPC command value can lead to power scaling for the transmissions on the SCG. However, $T_{offset}=T_{proc,2}^{mux}+6$ can be viewed as an upper bound and includes timelines needed for determining other transmission powers. The same applies for a triggered SRS transmission by a DCI format 2_3 and for a PRACH transmission triggered by a PDCCH order.

Figure 7:
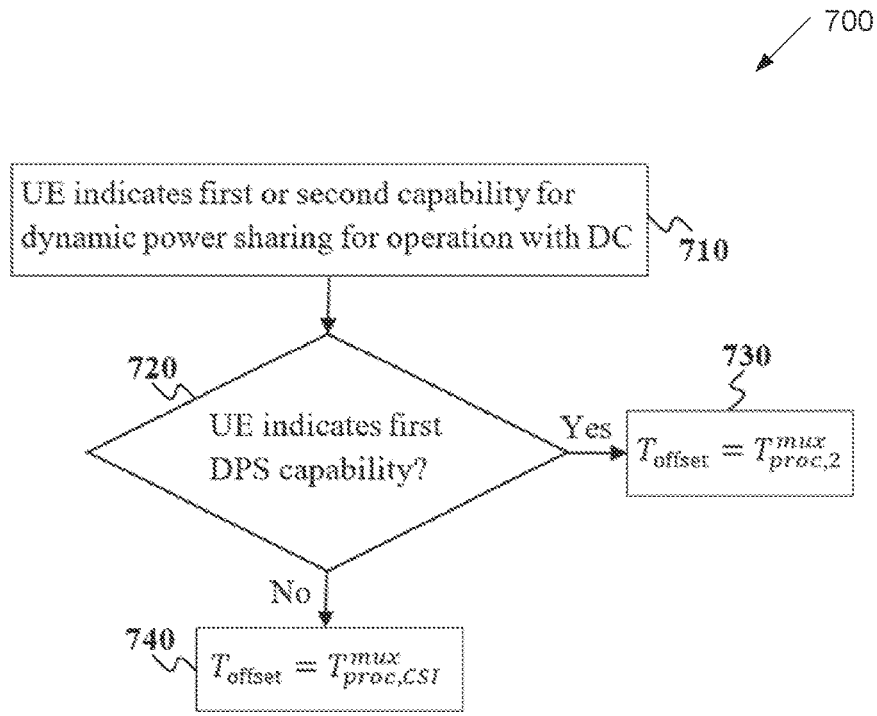
FIG. 7 illustrates a method for a UE to determine a transmission power on a SCG by considering scheduled transmissions on an MCG according to embodiments of the present disclosure.

FIG. 7 illustrates a method 700 for a UE to determine a transmission power on a SCG by considering scheduled transmissions on an MCG according to this disclosure. For example, the method 700 may be performed by the UE 116. The embodiment of the method 700 in FIG. 7 is provided for illustration only; other embodiments may be implemented in accordance with the principles of the present disclosure.

A UE indicates a first or second capability for dynamic power sharing for operation with dual connectivity step 710. The UE determines whether the UE indicated a first or a second DPS capability step 720. The UE does not expect to have transmissions on the MCG that are scheduled by DCI formats in PDCCH receptions with a last symbol that is earlier by less than or equal to $T_{offset} T_{proc,CSI}^{mux}$ from the first symbol of the transmission occasion on the SCG, and overlap with the transmission occasion on the SCG, wherein $T_{offset}=T_{proc,2}^{mux}$ when the UE indicates the first DPS capability step 730 and $T_{offset}=T_{proc,CSI}^{mux}$ when the UE indicates the second DPS capability step 740 wherein $T_{proc,2}^{mux,max}$ and $T_{proc,CSI}^{mux,max}$ are the maximum of the corresponding values of $T_{proc,2}^{mux}$ and $T_{proc,CSI}^{mux}$ for the UE across all cells of the MCG and of the SCG.

In the following, $T_{offset}=\max \{T_{proc,MCG}^{max}, T_{proc,SCG}^{max}\}$. For example, based on the configurations on the MCG and the SCG, $T_{proc,MCG}^{max}$ and $T_{proc,SCG}^{max}$ can be either a corresponding $T_{proc,2}^{mux}$, and then $T_{offset}=\max(T_{proc,2}^{mux})$, when a UE indicates a first value for the DPS capability (DPS capability 1) or a corresponding $T_{proc,CSI}^{mux}$, and then $T_{offset}=\max(T_{proc,CSI}^{mux})$, when the UE indicates a second value for the DPS capability (DPS capability 2).

DPS for DC operation relies on the MCG scheduler ensuring that a UE transmission on the MCG is delayed by $T_{offset}$ from the time of the end of an associated PDCCH reception so that it can be ensured that the UE does not have to adjust a transmission power on the MCG or the SCG due to an overlapping transmission on the MCG. Further, power allocation for transmissions on the MCG is prioritized. As previously discussed, in order to maximize throughput/ spectral efficiency and coverage gains from DPS, the value of $T_{offset}$ is of material importance as a value that is too small cannot satisfy UE processing requirements while a value that is too large diminishes the gains from DPS operation in DC. As $T_{offset}$ depends on $T_{proc,SCG}^{max}$ and as $T_{proc,SCG}^{max}$ depends on configurations of several parameters the UE has on the SCG, particularly of the UE PUSCH processing/ timing capability but also the configurations for CSI reporting on a PUSCH transmission for DPS capability 1, the SCS of the active UL BWP, and so on, the MN/MCG needs to know the configurations of such parameters on the SCG. Such knowledge is not always possible as some of those parameters can change by physical layer signaling, such as the active BWP, and it is also possible for the SCG to modify those parameters without MCG involvement. In such cases, the MN can negotiate with the SN a value for $T_{proc,SCG}^{max}$ referred to as $T_{proc,SCG}^{max,xCG}$ and can compute $T_{offset}$ as $T_{offset}=\max \{T_{proc,MCG}^{max}, T_{proc,SCG}^{max,xCG}\}$. It is also possible that the SN rejects the negotiation with the MN to avoid any restrictions in allowable configurations of parameters to the UE.

In a second embodiment, when the SN rejects a negotiation with the MN for a value of $T_{proc,SCG}^{max,xCG}$, the MN has to determine a value for $T_{proc,SCG}^{max,xCG}$ so that the actual $T_{proc,SCG}^{max}$ on the SCG will always be smaller than or equal to $T_{proc,SCG}^{max,xCG}$.

The MN will need to assume the following for the configurations of the UE on the SN:
a) Configuration of PUSCH processing/timing capability 1
b) A cell where the UE is configured SCS configuration μ=0 (15 kHz SCS) if at least one cell of the SCG has a carrier frequency in a first frequency range (FR1) of frequencies below 6 GHz.
c) A-CSI multiplexing in the PUSCH resulting to the largest possible value of Z equal to 40 symbols for SCS configuration μ=0 (15 kHz SCS).

Then,
a) when the UE declares DPS capability 1, $T_{proc,SCG}^{max,xCG}=T_{proc,CSI}^{mux}=\max((Z+d)\cdot(2048+144)\cdot\kappa\cdot2^{-\mu}\cdot T_c, d_{2,2})=\max((40+2)\cdot(2048+144)/(15\cdot10^3\cdot2048)\cdot1000, 1)$ milliseconds=3 milliseconds
b) when the UE declares DPS capability 2, $T_{proc,SCG}^{max,xCG}=T_{proc,2}^{mux,i}=\max((N_2+d_{2,1}+1)\cdot(2048+144)\cdot\kappa\cdot2^{-\mu}\cdot T_c, d_{2,2})=\max((10+1)\cdot(2048+144)/(15\cdot10^3\cdot2048)\cdot1000, 1)$ milliseconds
   a. If the UE indicates a capability for BWP change, $T_{proc,SCG}^{max,xCG}=d_{2,2}=1$ millisecond (for SCS configuration μ=0)
   b. If the UE does not indicate a capability for BWP change, $T_{proc,SCG}^{max,xCG}=(N_2+d_{2,1}+1)\cdot(2048+144)\cdot\kappa\cdot2^{-\mu}\cdot T_c=0.785$ milliseconds (for SCS configuration μ=0)

Figure 8:
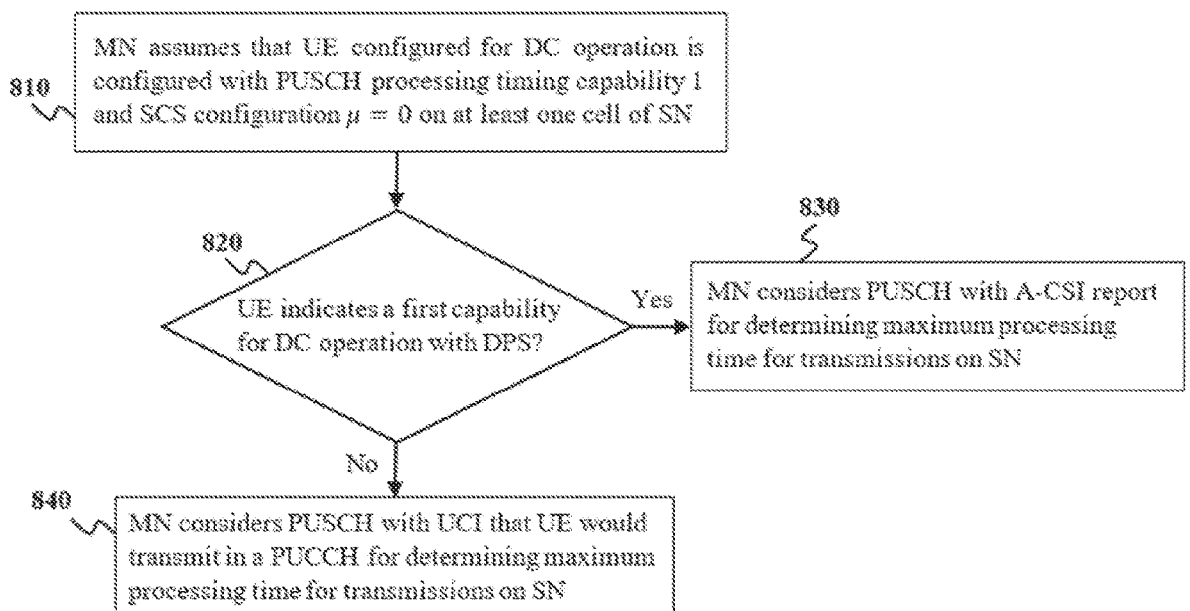
FIG. 8 illustrates a method for an MN to determine a maximum processing time for transmissions from a UE on an SN according to embodiments of the present disclosure.

When the MN knows that all cells of the SN operate in carrier frequencies of a second frequency range (FR2) that is above 6 GHz, then the MN knows that the UE operates with PUSCH processing/timing capability 1 and SCS configuration μ=3 (120 kHz SCS), and Z=152 symbols. Then,
a) when the UE declares DPS capability 1, $T_{proc,SCG}^{max,xCG}=T_{proc,CSI}^{mux}=\max((Z+d)\cdot(2048+144)\cdot\kappa\cdot2^{-\mu}\cdot T_c, d_{2,2})=\max((152+2)\cdot(2048+144)/(8\cdot15\cdot10^3\cdot2048)\cdot1000, 0.625)$ milliseconds=1.374 milliseconds
b) when the UE declares DPS capability 2, $T_{proc,SCG}^{max,xCG}=T_{proc,2}^{mux,i}=\max((N_2+d_{2,1}+1)\cdot(2048+144)\cdot\kappa\cdot2^{-\mu}\cdot T_c, d_{2,2})=\max((36+1)\cdot(2048+144)/(8\cdot15\cdot10^3\cdot2048)\cdot1000, 0.625)$ milliseconds
   a. If the UE indicates a capability for BWP change, $T_{proc,SCG}^{max,xCG}=d_{2,2}=0.625$ millisecond
   b. If the UE does not indicate a capability for BWP change, $T_{proc,SCG}^{max,xCG}=(N_2+d_{2,1}+1)\cdot(2048+144)\cdot\kappa\cdot2^{-\mu}\cdot T_c=0.330$ milliseconds FIG. 8 illustrates a method 800 for an MN to determine a maximum processing time for transmissions from a UE on an SN according to this disclosure. For example, the method 800 may be performed by any of the BS 101-103. The embodiment of the method 800 in FIG. 8 is provided for illustration only; other embodiments may be implemented in accordance with the principles of the present disclosure.

A MN assumes that a UE configured for DC operation is also configured with PUSCH processing/timing capability 1 and SCS configuration μ=0 on at least one cell of the SN step 810. The MN further considers whether the UE indicates a first DPS capability or a second DPS capability for DC operation step 820. When the UE indicates the first DPS capability, the MN considers a PUSCH transmission where a UE multiplexes a CSI report based on a corresponding request in a DCI format scheduling the PUSCH transmission (A-CSI report) in order to determine a maximum processing time for transmission from the UE on the SN step 830. When the UE indicates the second DPS capability, the MN considers a PUSCH transmission where a UE multiplexes UCI that the UE would transmit in a PUCCH, that is UCI other than an A-CSI report, in order to determine a maximum processing time for transmission from the UE on the SN 840. Further the MN can consider whether the UE indicates a DPS capability for an active BWP change.

A third embodiment considers establishing a common understanding of $T_{offset}$ among a MN, a SN, and a UE. A UE needs to know $T_{offset}$ because $T_{offset}$ determines several UE functionalities including scheduling of PUSCH/PUCCH/ SRS transmissions and processing of TPC commands.

When a MN knows the UE configurations on the SN, the MN does not need to provide any additional information to the UE. As the MN knows its own configurations for the UE and as the UE knows the configurations from the MN and the SN, the UE can determine $T_{offset}$ as $T_{offset}=\max\{T_{proc,MCG}^{max}, T_{proc,SCG}^{max}\}$.

When the MN does not know the UE configurations on the SN, the MN needs to provide to the UE a value for $T_{proc,SCG}^{max,xCG}$ in order for the UE to determine $T_{offset}$ as $T_{offset}=\max\{T_{proc,MCG}^{max}, T_{proc,SCG}^{max,xCG}\}$, regardless of whether or not the SN accepts a suggestion by the MN for a value of $T_{proc,SCG}^{max,xCG}$.

Therefore, the UE can determine $T_{offset}$ depending on whether or not the UE is provided $T_{proc,SCG}^{max,xCG}$ by a higher layer parameter maxTprocSCG. If the UE is not provided maxTprocSCG, the UE determines $T_{offset}=\max\{T_{proc,MCG}^{max}, T_{proc,SCG}^{max}\}$. If the UE is provided maxTprocSCG with value $T_{proc,SCG}^{max,xCG}$, the UE determines $T_{offset}=\max\{T_{proc,MCG}, T_{proc,SCG}^{max,xCG}\}$.

Figure 9:
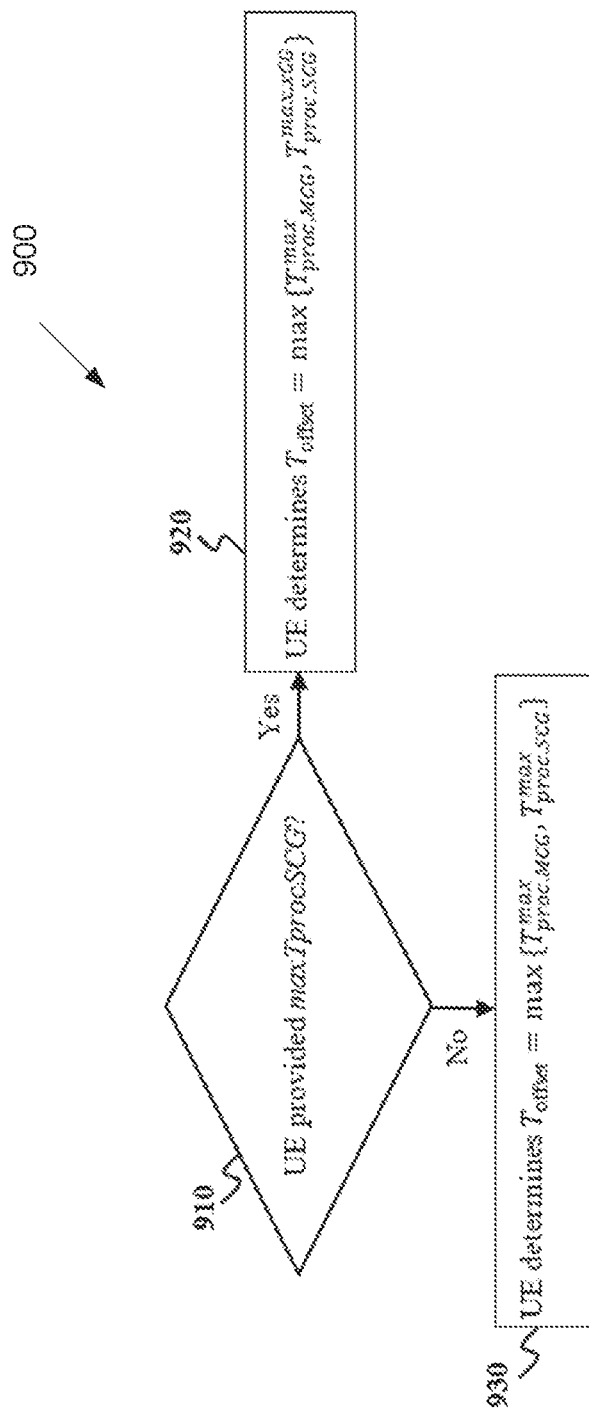
FIG. 9 illustrates a method for a UE to determine a minimum time offset between an end of a PDCCH reception scheduling a transmission and the beginning of the transmission according to embodiments of the present disclosure.

FIG. 9 illustrates a method 900 for a UE to determine a minimum time offset between an end of a PDCCH reception scheduling a transmission and the beginning of the transmission according to this disclosure. For example, the method 900 may be performed by the UE 116. The embodiment of the method 900 in FIG. 9 is provided for illustration only; other embodiments may be implemented in accordance with the principles of the present disclosure.

A UE determines whether or not the UE is provided higher layer parameter maxTprocSCG by a MN step 910. When the UE is provided maxTprocSCG by the MN, the UE determines the time offset as $T_{offset}=\max\{T_{proc,MCG}^{max}, T_{proc,SCG}^{max,xCG}\}$, where $T_{proc,SCG}^{max,xCG}$ is the value of maxTprocSCG step 920. When the UE is not provided maxTprocSCG by the MN, the UE determines the time offset as $T_{offset}=\max\{T_{proc,MCG}^{max}, T_{proc,SCG}^{max,xCG}\}$ step 930, where the UE determines $T_{proc,SCG}^{max}$ based on configurations of transmission parameters, such as a UE processing/timing capability, on cells of the SN depending on whether the UE indicates a first DPS capability or a second DPS capability. The UE determines $T_{proc,MCG}^{max}$ based on configurations of transmission parameters on cells of the MN depending on whether the UE indicates a first DPS capability or a second DPS capability. When the UE indicates the first DPS capability, $T_{proc,SCG}^{max}$ includes a processing time for multiplexing an A-CSI report in a PUSCH. When the indicates the second DPS capability, $T_{proc,SCG}^{max}$ does not include a processing time for multiplexing an A-CSI report in a PUSCH.

It is also possible to avoid use of higher layer signaling to a UE for the UE to determine $T_{proc,SCG}^{max,xCG}$ and $T_{offset}$. In such case, a UE can assume that $T_{proc,SCG}^{max}$ is not determined according to actual configurations at a given time on the SCG, such as for SCS or UE PUSCH processing capability, but instead $T_{proc,SCG}$ is determined over all possible configurations on the SCG and $T_{proc,SCG}^{max}=\max_{SCG,configs} T_{proc,SCG}^{max}$. Then, when the MN and the SN determine, for example through a negotiating procedure, a $T_{offset}$ that is larger than the maximum $T_{offset}$ for DPS capability 2, the MN can configure the UE to operate with DPS capability 1. Then the UE can assume, for example, $T_{proc,SCG}^{max}=3$ milliseconds or, in general, a maximum $T_{offset}$ for DPS capability 1. When the MN and the SN determine a $T_{offset}$ that is not larger than the maximum $T_{offset}$ for DPS capability 2, the MN can configure the UE to operate with DPS capability 2. Then the UE can assume, for example, that $T_{proc,SCG}^{max}=0.86$ milliseconds (equal to $T_{proc,2}^{max}$ for SCS configuration $\mu=0$) or, in general, a maximum $T_{offset}$ for DPS capability 2 such as for example 0.50 milliseconds (equal to $T_{proc,2}^{max}$ for SCS configuration $\mu=1$) if SCS configuration $\mu=0$ is not configured (cannot be used) for any BWP on the SCG and SCS configuration $\mu=1$ is configured (can be used). The BWP can be an active BWP or any configured BWP on the SCG.

Therefore, if a UE is not provided $T_{proc,SCG}^{max,xCG}$, the UE assumes $T_{offset}=3$ milliseconds when the UE is configured for DPS capability 1 and the UE assumes $T_{offset}=0.86$ milliseconds when the UE is configured for DPS capability 2. As an enhancement, the maximum value for $T_{offset}$ for a corresponding DPS capability can be reduced based on a smallest possible SCS configuration $\mu$ the UE can determine that the UE is possible to operate with on an active BWP of the MN or the SN.

Although the present disclosure has been described with an example embodiment, various changes and modifications can be suggested by or to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. A method performed by a user equipment (UE) in a wireless communication system, the method comprising:
   receiving information on dynamic power sharing (DPS) for dual connectivity;
   identifying sub-carrier spacing (SCS) configuration information and information for a physical uplink shared channel (PUSCH) processing capability;
   determining a time offset $T_{offset}$ based on the SCS configuration information and the information for the PUSCH processing capability;
   determining a maximum power for a PUSCH transmission on a secondary cell group (SCG), based on the time offset $T_{offset}$ and a transmission on a master cell group (MCG) that is scheduled by a downlink control information (DCI) format; and
   performing the transmission on the MCG and the PUSCH transmission on the SCG, wherein a power for the PUSCH transmission on the SCG is determined based on the maximum power.

2. The method of claim 1, further comprising transmitting information indicating a capability to support the DPS for the dual connectivity.

3. The method of claim 2,
   wherein the time offset $T_{offset}$ is determined as one of a first maximum or a second maximum based on the capability to support the DPS,
   wherein the first maximum is a maximum value between a processing time for multiplexing first uplink control information (UCI) in a PUSCH transmission on the MCG and a processing time for multiplexing second UCI in a PUSCH transmission on the SCG, wherein the first and second UCIs do not include a channel state information (CSI) report triggered by a DCI format, and
   wherein the second maximum is a maximum value between a processing time for multiplexing a first CSI report in a PUSCH transmission on the MCG and a processing time for multiplexing a second CSI report in a PUSCH transmission on the SCG, wherein the first and second CSI reports are triggered by a DCI format.

4. The method of claim 1, further comprising:
   determining a total power $\hat{P}_{MCG}^{actual}$ for the transmission on the MCG that overlaps with a transmission occasion on the SCG;
   receiving configuration information for a maximum power $P_{Total}^{NR-DC}$ for transmission on the MCG and on the SCG; and receiving configuration information for a maximum power $P_{SCG}$ for transmission on the SCG, wherein the maximum power for the PUSCH transmission on the SCG is a minimum between $\hat{P}_{SCC}$ and $\hat{P}_{Total}^{NR-DC} - \hat{P}_{MCG}^{actual}$, where $\hat{P}_{SCG}$ is a linear value of $P_{SCG}$ and $\hat{P}_{Total}^{NR-DC}$ is a linear value of $P_{Total}^{NR-DC}$, and wherein the power for the PUSCH transmission on the SCG is not larger than the maximum power.

5. The method of claim 1, further comprising:

determining a total power $\hat{P}_{MCG}^{actual}$ to include a power for a transmission on the MCG that is adjusted based on a value of a transmission power control (TPC) command in a second DCI format only in case the second DCI format is provided by a second PDCCH reception that ends at least the time offset $T_{offset}$ before a beginning of the PUSCH transmission on the SCG, wherein the transmission on the MCG is configured by higher layer signaling, and wherein the transmission on the MCG includes at least one of a PUSCH, a physical uplink control channel (PUCCH), a physical random access channel (PRACH), and a sounding reference signal (SRS).

6. A user equipment (UE) in a wireless communication system, the UE comprising:

a transceiver configured to receive information on dynamic power sharing (DPS) for dual connectivity, and a processor operably coupled to the transceiver and configured to:
identify sub-carrier spacing (SCS) configuration information and information for a physical uplink shared channel (PUSCH) processing capability,
determine a time offset $T_{offset}$ based on the SCS configuration information and information for the PUSCH processing capability,
determine a maximum power for a PUSCH transmission on a secondary cell group (SCG), based on the time offset $T_{offset}$ and a transmission on a master cell group (MCG) that is scheduled by a downlink control information (DCI) format, and
control the transceiver to perform the transmission on the MCG and the PUSCH transmission on the SCG, wherein a power for the PUSCH transmission on the SCG is determined based on the maximum power.

7. The UE of claim 6, wherein the transceiver is further configured to transmit information indicating a capability to support the DPS for the dual connectivity.

8. The UE of claim 7, wherein the time offset $T_{offset}$ is determined as one of a first maximum or a second maximum based on the capability to support the DPS, wherein the first maximum is a maximum value between a processing time for multiplexing first uplink control information (UCI) in a PUSCH transmission on the MCG and a processing time for multiplexing second UCI in a PUSCH transmission on the SCG, wherein the first and second UCIs do not include a channel state information (CSI) report triggered by a DCI format, and wherein the second maximum is a maximum value between a processing time for multiplexing a first CSI report in a PUSCH transmission on the MCG and a processing time for multiplexing a second CSI report in a PUSCH transmission on the SCG, wherein the first and second CSI reports are triggered by a DCI format.

9. The UE of claim 6, wherein the processor is further configured to determine a total power $\hat{P}_{MCG}^{actual}$ for the transmission on the MCG that overlaps with a transmission occasion on the SCG, wherein the transceiver is further configured to receive:
configuration information for a maximum power $P_{Total}^{NR-DC}$ for transmission on the MCG and on the SCG, and
configuration information for a maximum power $P_{SCG}$ for transmission on the SCG, wherein the maximum power for the PUSCH transmission on the SCG is a minimum between $\hat{P}_{SCC}$ and $\hat{P}_{Total}^{NR-DC} - \hat{P}_{MCG}^{actual}$, where $\hat{P}_{SCG}$ is a linear value of $P_{SCG}$ and $\hat{P}_{Total}^{NR-DC}$ is a linear value of $P_{Total}^{NR-DC}$, and wherein the power for the PUSCH transmission on the SCG is not larger than the maximum power.

10. The UE of claim 6, wherein the processor is further configured to determine a total power $\hat{P}_{MCG}^{actual}$ include a power for a transmission on the MCG that is adjusted based on a value of a transmission power control (TPC) command in a second DCI format only in case the second DCI format is provided by a second PDCCH reception that ends at least the time offset $T_{offset}$ before a beginning of the PUSCH transmission on the SCG, wherein the transmission on the MCG is configured by higher layer signaling, and wherein the transmission on the MCG includes at least one of a PUSCH, a physical uplink control channel (PUCCH), a physical random access channel (PRACH), and a sounding reference signal (SRS).

11. A base station in a wireless communication system, the base station comprising:

a processor; and a transceiver operably connected to the processor, the transceiver configured to:
transmit information on dynamic power sharing (DPS) for dual connectivity,
transmit a downlink control information (DCI) format scheduling an uplink transmission on a master cell group (MCG), and
receive an uplink transmission on the MCG and a physical uplink shared channel (PUSCH) on a secondary cell group (SCG), wherein a maximum power for the PUSCH on the SCG is based on a time offset $T_{offset}$ and the uplink transmission on the MCG, wherein the time offset $T_{offset}$ is based on sub-carrier spacing (SCS) configuration information and information for a PUSCH processing capability, and wherein the PUSCH on the SCG is received with a power based on the maximum power.

12. The base station of claim 11, wherein the transceiver is further configured to receive information indicating a capability to support the DPS for the dual connectivity, and wherein the uplink transmission on the MCG overlaps with a transmission occasion on the SCG.

13. The base station of claim 12, wherein a last symbol of a physical control channel (PDCCH) including the DCI format is earlier by at least the time offset $T_{offset}$ from a beginning of reception of the PUSCH on the SCG, wherein the time offset $T_{offset}$ is one of a first maximum or a second maximum based on the capability to support the DPS, wherein the second maximum is based on a first processing time for multiplexing a channel state information (CSI) report triggered by a DCI format in a PUSCH, and wherein the first maximum is based on a second processing time for multiplexing uplink control information (UCI) in a PUSCH, wherein the UCI does not include a CSI report triggered by a DCI format.

14. The base station of claim 12, wherein the transceiver is further configured to transmit a second PDCCH that provides a second DCI format including a transmission power control (TPC) command, and wherein the TPC command is for a second PUSCH transmission configured by a higher layer signaling in case a beginning of the transmission occasion on the SCG is after an end of the second PDCCH transmission by at least the time offset.

15. The base station of claim 11, wherein the transceiver is further configured to transmit a second PDCCH that provides a second DCI format, wherein the second DCI format triggers a transmission of a physical random access channel (PRACH) or a transmission of a sounding reference signal (SRS), and wherein a beginning of the PRACH transmission is after an end of the second PDCCH transmission by at least the time offset.

* * * * *